United States Patent [19]

Moses et al.

[11] 4,425,642

[45] Jan. 10, 1984

[54] SIMULTANEOUS TRANSMISSION OF TWO INFORMATION SIGNALS WITHIN A BAND-LIMITED COMMUNICATIONS CHANNEL

[75] Inventors: Donald W. Moses, Minneapolis, Minn.; Charles Hustig, Hudson, Wis.; C. Ray Ballard, Venice, Fla.

[73] Assignee: Applied Spectrum Technologies, Inc., Minneapolis, Minn.

[21] Appl. No.: 337,957

[22] Filed: Jan. 8, 1982

[51] Int. Cl.³ .......................... H04J 15/00; H04J 11/00
[52] U.S. Cl. ............................................ 370/76; 370/11; 370/19; 370/119; 375/48
[58] Field of Search .......................... 370/76, 11, 18, 19, 370/69.1, 119, 110.1; 375/48, 51

[56] References Cited

U.S. PATENT DOCUMENTS

| | | | |
|---|---|---|---|
| 3,377,625 | 4/1968 | Filipowsky | 375/48 |
| 3,810,019 | 5/1974 | Miller | 375/48 |
| 3,875,339 | 4/1975 | Gruen et al. | 370/76 |
| 4,238,849 | 12/1980 | Gassmann | 370/76 |

Primary Examiner—Douglas W. Olms
Attorney, Agent, or Firm—Dorsey & Whitney

[57] ABSTRACT

A co-channel communications system is disclosed which permits a digital data signal to be simultaneously transmitted with a communications medium signal such as telephone voice or television video. The data signal or signals are converted into very low multifrequency signals consisting of fundamental frequencies and harmonics which span the communications bandwidth. Because a number of frequencies are used for each data signal, the signal level of the data signals can be greatly suppressed relative to the communications medium signal to a level such that there is no perceptible degradation of the telephone voice or television video. Synchronous detectors for each frequency transmitted, including harmonic frequencies, are utilized to recapture and regenerate the data signals transmitted.

23 Claims, 6 Drawing Figures

SIMULTANEOUS TRANSMISSION OF TWO INFORMATION SIGNALS WITHIN A BAND-LIMITED COMMUNICATIONS CHANNEL

BACKGROUND OF THE INVENTION

It is often desirable to add a data signal to an existing voice or television video communications channel in order to transmit both signals independently and simultaneously over the communications system.

Conventional systems in use today use out of band types of transmission with data transmission usually above the voice information but not in with the voice information. Many transmission lines are limited in bandwidth to just voice response because of loading coils or carrier channels and such systems cannot accommodate these out of band signals. A number of attempts have been made to transmit add-on data signals over a single transmission channel of predetermined bandwidth.

Attempts in the past to simultaneously transmit voice or video and data information simultaneously are represented by a number of issued patents. For example, U.S. Pat. No. 3,529,088 teaches a method of multiplexing sequential transmission of voice information and data information. Two patents, U.S. Pat. Nos. 3,894,190 and 4,238,849, teach a method of transmitting data over voice information by modulating digital message signals onto a subcarrier which lies in the ear psychological masking range (See FIGS. 3 and 2 of those references respectively) of a simultaneously transmitted broadcast message. U.S. Pat. No. 3,406,344 teaches a method of modulating the voice carrier to transmit low frequency signals.

U.S. Pat. No. 3,512,160 uses delay lines to transmit and detect transmitted signals which are decoded after the delay times to reconstruct the original signal(s). U.S. Pat. No. 3,838,444 teaches a method of altering a carrier signal which doubles the frequency of the carrier signal to indicate data transmission.

None of the foregoing systems achieves simultaneous real time transmission of data signals along with voice or other information with data signals occupying the same bandwidth as the other information signal and sufficiently dispersed throughout the bandwidth so that the data signals have no appreciable effect on the other information transmitted.

SUMMARY OF THE INVENTION

Applicants achieve noninterfering simultaneous transmission of two information signals by spreading the data signal throughout the frequency spectrum to produce a co-channel transmission of the two information signals. Co-channel means that both signals utilize all of the same frequency band, i.e. they occupy the same channel spectrum. Only the data signal is spread spectrum processed and therefore the transmission technique enables the independent simultaneous transmission of data and telephone voice; data and television video; or data and any other such signal occupying a particular communications medium channel such as return data transmitted on a high facsimile channel. It enables the data signal to be added to, and at the receiver separated from the existing communications medium signal without interfering with that signal or vice versa.

To transmit the data signal Applicant uses a multi-frequency, data signal transmitter which generates "n" number of frequencies, all of which lie within the communications medium bandwidth. Because the spectral energy of the data signal is spread between "n" frequencies, the data signal's energy results in a pseudo random noise characteristic such that when added to a voice channel there is an imperceptible increase in "white" noise. The addition of the data signal energy to a video channel results in an imperceptible decrease in picture resolution.

The spectrum of a typical communications medium signal has several discrete energy components which move rapidly up and down the spectrum as the voice or video information changes. These spectral components destructibly interfere with the data signal energy at these discrete spectral points. The "spread," multi-frequency, data signal, however, is not degraded to a point of serious interference due to its "spread" nature throughout the spectrum of the bandwidth. In practical applications no more than about one-half of the "spread" multi-frequency, data signal energy is affected by the discrete components of a voice or video spectrum. The use of a plurality of frequencies in the "spread," multi-frequency, data signal also enables substantial level suppression relative to the "discrete" signal components.

The data signal receiver also consists of a device which generates "n" frequencies corresponding to those transmitted. Each of these frequencies is an input to one of "n" synchronous detectors, the second input to which is the communications channel input. The product output of each synchronous detector contains a DC component if the input signal contains a corresponding frequency component. The output from the synchronous detectors and subsequent filtering circuitry, are summed in summing amplifiers, one for a "mark" and one for a "space", which add signals levels and the resulting voltages are connected to a comparator threshhold detector. The comparator output is the recovered data signal.

It is therefore an object of the invention to simultaneously transmit on a real time basis two distinct signals on the same commmunications channel without appreciable distortion of either signal.

It is an object of the invention to transmit a data signal on the same communications channel in which another information signal is being transmitted by suppressing the level of the data signal to more than ten dB below the level of the other signal.

It is another object of the invention to achieve simultaneous co-channel transmission of voice or video signals and a data signal by converting the data signal into a plurality of frequencies and transmitting the frequencies throughout the bandwidth of the voice or video signal.

It is an object of the invention to spread the energy spectrum of a data signal throughout a communication channel bandwidth and thereby greatly suppress the energy level of the data signal relative to a discrete information signal transmitted simultaneously on the same channel.

These and other advantages, features and objectives of this invention and the manner of attaining them will become more apparent and the invention itself will best be understood by reference to the following description of the embodiments of the invention in conjunction with the accompanying drawings.

DESCRIPTION OF THE DRAWINGS

FIG. 4, comprising 4a through 4c, is a schematic diagram of the spread spectrum receiver.

DESCRIPTION OF THE PREFERRED EMBODIMENT

Figure 1:
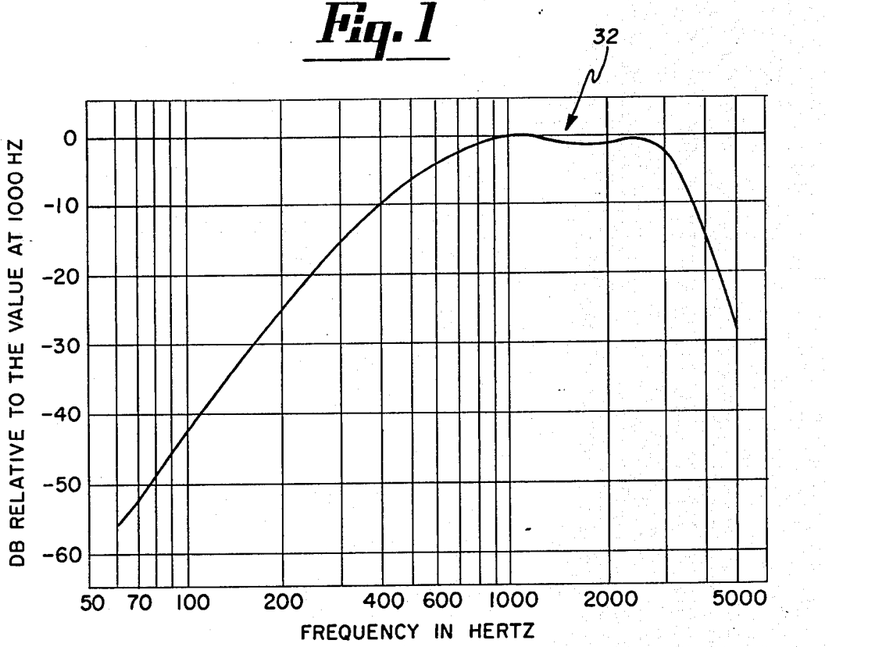
FIG. 1 is a standard C-message weighting curve showing the sound intensity required to produce an equivalent psychological reaction to a listener listening to a one thousand hertz tone.

FIG. 1 is the convention C-message weighting curve 32. As represented in FIG. 1, at representative frequencies of one hundred eighty hertz, three hundred sixty hertz and five hundred forty hertz, the reaction by a subscriber using a standard conventional type telephone set will be such that he hears these frequencies less loud by 27.5, 16.5 and 6 dB, respectively, than had this frequency been one thousand hertz and of the same magnitude. Stated in a different way, if the individual frequencies of one hundred eighty hertz, three hundred sixty hertz, and five hundred forty hertz were to produce the same stimulus (psychological reaction to the listener) as one thousand hertz tone, they must be increased in level by 27.5, 16.5 and 6 dB, respectively, compared to the level or magnitude of one thousand hertz reference tone. This illustrates that different frequencies have different effects on hearing when using a conventional type telephone set. When applied to noise, this means that some frequencies have more interfering effect than others. The interfering effect of the different frequencies for equal loudness is the basis of any weighting curve which is used to measure over-all circuit noise.

The present invention takes into consideration the psychological reaction to frequency and, as will be explained in more detail with reference to FIG. 3 below, creates a multifrequency transmission using a basic plurality of fundamental frequencies which lie in the lower frequency range of the C-message weighting curve. Third harmonics of those fundamental frequencies are also transmitted and detected, but are suppressed ten db below the fundamental frequencies which frequencies can lie in the higher frequency range of the C-message weighting curve. Similarly, fifth harmonics are also generated and transmitted but at a sixteen dB level below the transmission of the fundamental frequencies. These harmonics can also be detected with synchronous detectors described in more detail with reference to FIG. 4. By transmitting and detecting a plurality of fundamental frequencies as well as third and fifth harmonics of those frequencies the spectral energy of the data information is spread throughout the bandwidth, has neither a "pink" nor "blue" noise characteristic, but rather, if perceivable at all, has the appearance of "white" noise which is imperceptible to a listener hearing voice communications or to a viewer watching a video transmission.

Since the harmonic values are suppressed relative to the fundamental values in the same general manner that such tones have a psychological impact on the listener the relative levels of signal to noise "y" appear constant over the frequency bandwidth to produce a constant level of white noise throughout the bandwidth which is substantially suppressed relative to the typical communications medium signal, e.g. telephone voice signal or television video signal, so that at most a white noise is produced which is imperceptible to the listener.

Figure 2:
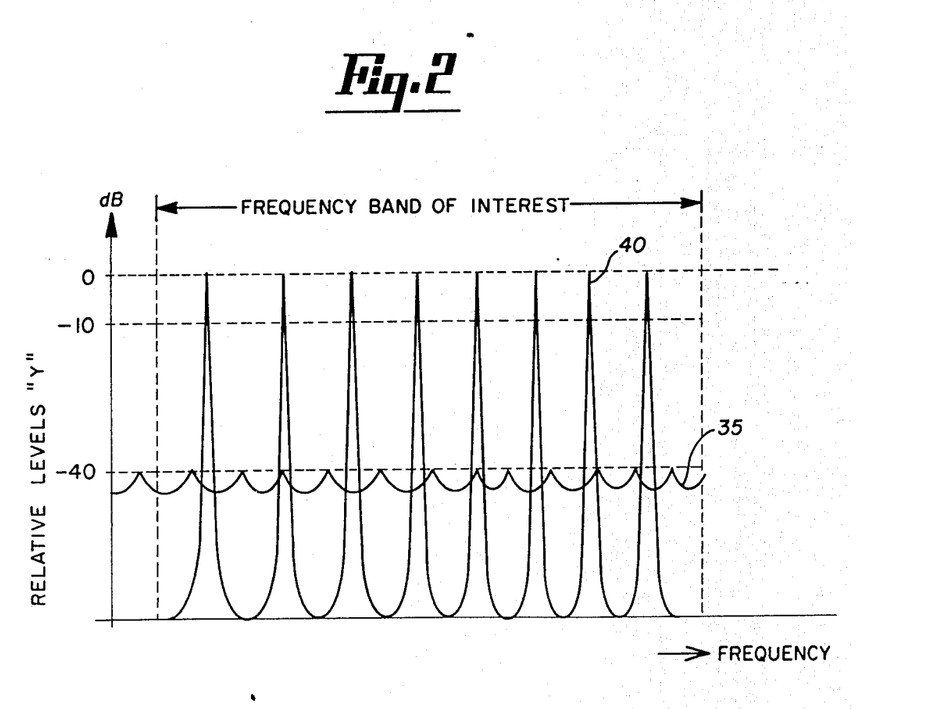
FIG. 2 is a graph of the spectral energy of a transmitted multi-frequency data signal using the present invention compared with the spectral energy of a typical communications medium signal.

This effect is graphically illustrated in FIG. 2 which shows that one preferred embodiment of the invention, using thirty-two frequencies, produces a signal 35 level which is suppressed forty dB relative to the discrete, communications medium signal 40.

The following table indicates the suppression that can be achieved with various embodiments of the invention:

| The number of frequencies used in the "spread" multi-frequency data signal. ("n") (In powers of 2) | Typical suppressed levels relative to the discrete, communications medium signal. ("y") |
|---|---|
| 1 | −10 db |
| 2 | −16 |
| 4 | −22 |
| 8 | −28 |
| 16 | −34 |
| 32 | −40 |
| 64 | −46 |
| 128 | −52 |

Figure 3:
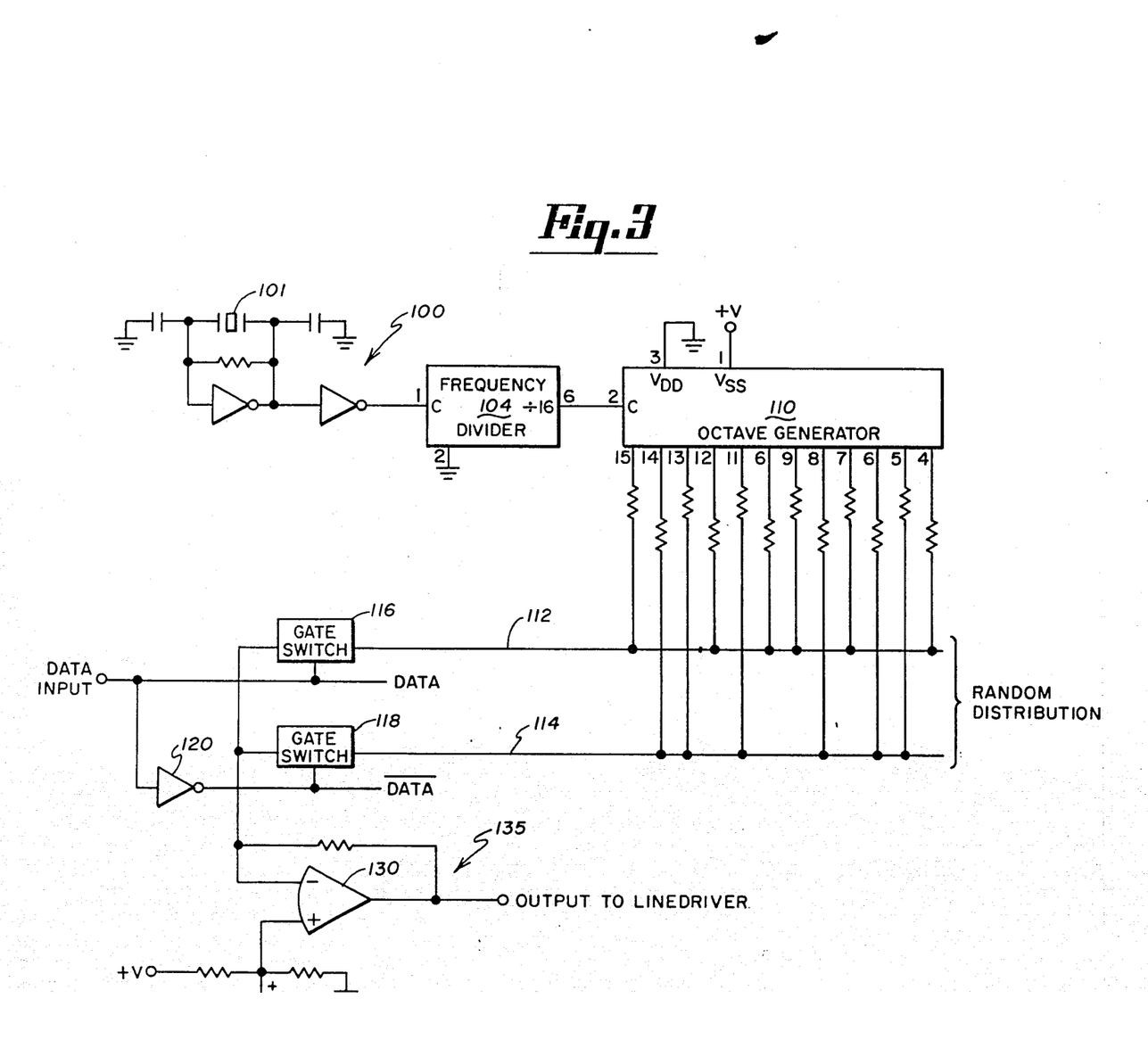
FIG. 3 is a schematic diagram of the transmitting circuit which converts data input to "n" frequencies for transmission of the data signal simultaneously with the voice or video or other information signal.

Generation of the multifrequency data signal 35 is achieved with the circuit shown in FIG. 3.

As shown in FIG. 3, a 2.56 megahertz oscillator circuit 100 is used to generate a basic clock frequency. The oscillator 100 is connected to a frequency divider 104 to divide the frequency by sixteen which is used to drive the clock of a General Instruments top octave generator 110, manufacturer's designation AY-3-0215. The top octave generator 110 is used to pack as many frequencies as close together as possible. The outputs of the frequency generator 110, pins 4 through 15, are randomly distributed on two output lines 112, 114, half of the frequencies to be used to indicate a mark or logic "1" and half of the frequencies to be used to indicate a space or logic "0". Because of the random distribution frequencies there is no noticeable change in what is "heard" on the line for a mark in a space.

The output of the octave generator 110 will create twelve fundamental frequencies, twelve third harmonic frequencies which are suppressed ten dB from the fundamental frequency magnitude level, and twelve fifth harmonic frequencies which will be suppressed sixteen dB below the fundamental frequency magnitude level. A preferred embodiment, for use with voice transmissions, will generate the following frequencies:

| Octave Generator 110 | | | |
|---|---|---|---|
| Pin # | Divisor | Output Frequencies | |
| 15 | 239 | 669 | Fundamentals |
| 14 | 253 | 632 | |
| 13 | 269 | 597 | |

-continued

| | Octave Generator 110 | | |
|---|---|---|---|
| Pin # | Divisor | Output Frequencies | |
| 12 | 284 | 563 | |
| 11 | 301 | 532 | 0 dB |
| 10 | 319 | 502 | |
| 9 | 338 | 473 | |
| 8 | 358 | 447 | |
| 7 | 379 | 422 | |
| 6 | 402 | 398 | |
| 5 | 426 | 376 | |
| 4 | 451 | 355 | |
| | | 2007 | Third Harmonics |
| | | 1896 | |
| | | 1791 | |
| | | 1689 | |
| | | 1596 | |
| | | 1506 | −10 dB |
| | | 1419 | |
| | | 1341 | |
| | | 1266 | |
| | | 1194 | |
| | | 1128 | |
| | | 1065 | |
| | | 3345 | Fifth Harmonics |
| | | 3160 | |
| | | 2985 | |
| | | 2815 | |
| | | 2660 | |
| | | 2510 | −16 db |
| | | 2365 | |
| | | 2235 | |
| | | 2110 | |
| | | 1990 | |
| | | 1880 | |
| | | 1775 | |

The data signal, which can be a fire alarm, an intrusion alarm, or any other digital data signal, is then connected to a pair of matched CMOS gate switches 116, 118 to switch on and transmit the top set of frequencies on line 112 if the data level is logic "1" and the bottom set of frequencies on line 114 if the data level is logic "0". The data signal is connected directly to the top CMOS gate switch 116 to pass the top set of frequencies on line 112 when logic level "1" is present on the data line. The data signal is inverted with inverter 120 and a high going signal, indicating logic level "0" is present, is connected to the bottom CMOS gate switch 118 when the data signal is logic "0".

The generated frequencies corresponding to the logic level to be transmitted are connected to the summing point of an operational amplifier 130. The configuration 135 of the operational amplifier instead of producing a gain, attenuates the signal so that the output 35, as shown in FIG. 2, will track the magnitude of the communication medium signal 40 at a substantially suppressed level. The output is then connected to the communications medium by a line driver circuit (not shown).

Figure 4A:
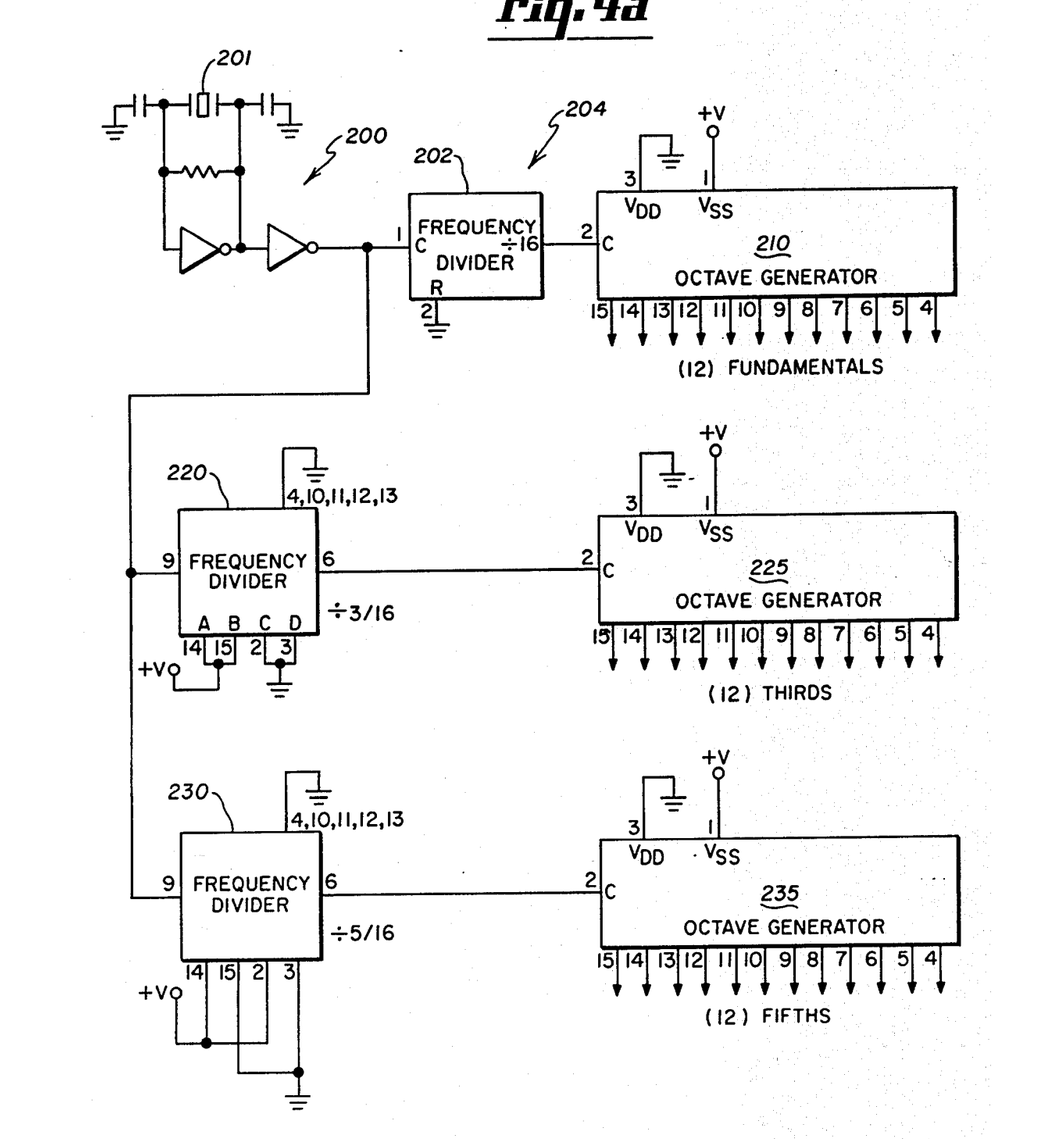
FIG. 4a shows the frequency generation circuitry to generate "n" frequencies for synchronous detection.
Figure 4B:
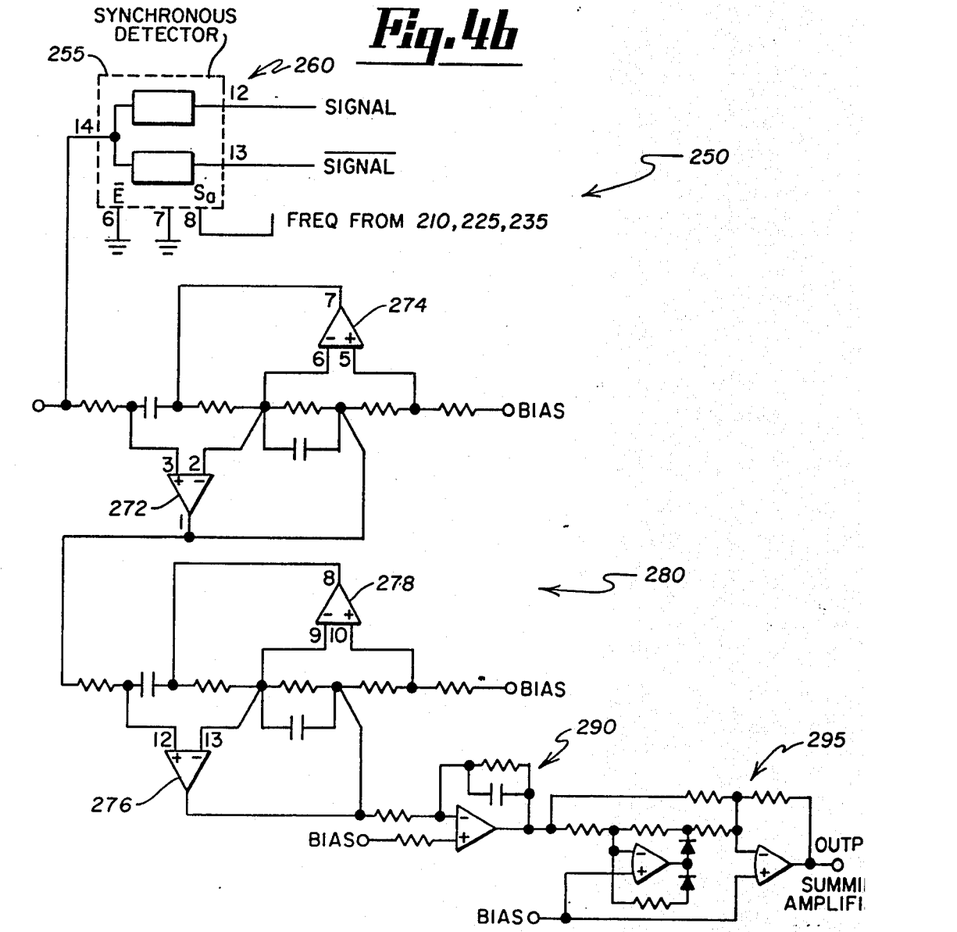
FIG. 4b shows one synchronous detector which is repeated "n" times for the number of frequencies utilized.
Figure 4C:
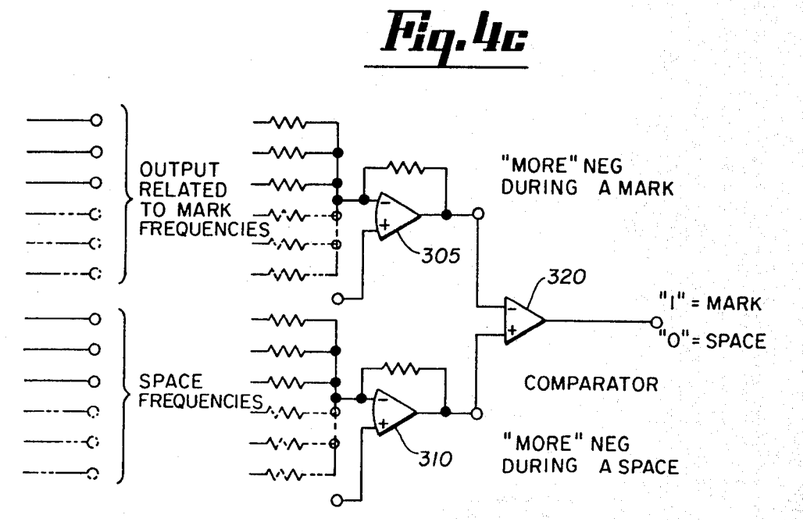
FIG. 4c is the conversion circuitry which receives the signal from each of the synchronous detectors and converts them to the recovered data signal.

FIG. 4, comprising FIGS. 4a through 4c, shows the receiver to receive the spread spectrum data signal 35. The same fundamental and harmonic frequencies are generated at the receiver in a manner similar to those transmitted with the use of a crystal controlled oscillator 200 also oscillating at the 2.56 megahertz rate. In this manner the identical frequencies can be generated within the accuracy of the oscillator crystals 101, 201. As with the transmitter, the oscillator frequency is divided by sixteen with a binary counter 202 operating as a frequency divider 204, which is connected to a top octave generator 210 to recreate the same fundamental frequencies used for transmission. The clock frequency is also divided at a three-sixteenths rate and at a five-sixteenths rate by two frequency dividers 220, 230, the output of each of which is connected to a similar octave generator 225, 235 to create the third harmonics and the fifth harmonics of the fundamental frequencies. This recreates the thirty-six frequencies generated and transmitted by the transmitter shown in FIG. 3.

As shown in FIG. 4b the multifrequency signal 35 is tapped off a line, the signal is inverted, and the signal 35 and inverted signal are connected to thirty-six synchronous detectors 250, each detector 250 taking the form of the detector 250 shown in FIG. 4b. Each synchronous detector circuit 250 uses one-third of a triple four channel multiplexer 255, manufacturer's designation 4053B, used as a demultiplexer 260.

In addition to the signal 35 and not-signal connections on pins 12 and 13 respectively, to the demultiplexer 260 one of the thirty-six frequencies from one of the three octave generators 210, 225, 235, is connected to the demultiplexer 260 to provide a fullwave synchronous detector. Since one of the thirty-six frequencies is used to toggle between the signal and signal high, the output at pin 14 is a small DC bias, positive or negative, when the frequency is present.

The output from pin 14 is connected through four operational amplifiers 272, 274, 276, 278, configured to be a two stage low pass filter 280 having a cut-off frequency of one hertz. The low pass filter 280 eliminates all of the high frequency noise relating to chopping of the voice signals or any other frequencies that are on the line and has a DC output if, and only if, the frequency corresponding to the synchronous detector 250 has been transmitted on the communications medium.

That DC output is amplified with a DC amplifier 290 having a gain of forty-seven and the output is then connected through a precision fullwave rectifier 295 to give an absolute value output corresponding to the magnitude of the signal, whether positive or negative.

As shown schematically in FIG. 4c, each of the thirty-six outputs are then connected to one of two summing amplifiers 305, 310. The synchronous detectors 250 which are toggled by a frequency relating to a mark at the transmitter are connected to one 305 of the summing amplifiers 305, 310 and those synchronous detectors 250 that are toggled by a frequency which relates to a space at the transmitter are connected to the second operational amplifier 310. The output of the mark summing amplifier 305 will be more negative while a mark is being transmitted and the output of the summing amplifier 310 associated with the space frequencies will be more negative during the transmission of a space. The outputs of the summing amplifiers are connected to a comparator 310, the output of which is the regenerated data signal having a logic "1" output when a mark is being transmitted and a logic "0" output when a space or logic "0" is being transmitted.

Summing of the frequency outputs provides the same advantage at the receiver as it does at the transmitter. In other words, every time the number of frequencies that are transmitted and summed together are doubled a six dB greater signal to noise ratio is obtained. In other words, if you were receiving information on two frequencies, one for a mark and one for a space, the signal would have to be transmitted at a certain level in order to receive an equivalent level out of the receiver. When two frequencies are used for each data transmission the power for each transmission can be six dB less, but when they are summed together the same amount of power output will be received. When four frequencies are used the transmission power can be twelve dB less and the same amount of power will be received.

As explained above, the interference caused by the communications medium signal 40 may degrade a number of the transmitted frequencies. However, since thirty-six frequencies are used to transmit and receive the data signal, sufficient correlation will be obtained at the receiver to accurately and consistently reconstruct the data signal transmitted. In this manner, the alarm indication or any other data can be transmitted in the same frequency band as a voice or video or other communications medium signal without interference of that signal and without perceptible detection by a user of the primary communications medium.

It should be obvious that there are other variations that could be used in conjunction with the instant invention. For example, a spectrum smearing modulation can be applied to the transmitting oscillator as well as to a modulator prior to the line driver. A vario-losser circuit can be used prior to the communications medium coupling circuit in conjunction with a communications medium signal level tracking circuit so that the transmitted signal is amplitude limited and tracks the communications signal amplitude. These and other variations of the invention wherein the spread spectrum frequency transmission is generated and transmitted by similar and equivalent means are intended to be within the scope of the following claims.

Having described our invention we claim:

1. A co-channel communications system for transmitting at least one digital data signal simultaneously with a communications medium signal comprising:
    means for generating a plurality of spreading frequencies:
    means for combining the data signal and the plurality of spreading frequencies which causes each logic level of the data signal to be transmitted as a multifrequency signal consisting of a separate set of frequencies, each set being spread throughout the bandwidth of the communications medium channel, each of said multifrequency signals having a signal amplitude at a level which is substantially suppressed in relation to the magnitude of the communications medium signal at a signal to signal ratio which is at a non-interfering level and which is a function of the number of frequencies used for transmission of the data signal; and
    means for connecting the resulting multifrequency signal to the communications medium for simultaneous transmission with the communication medium signal.

2. The co-channel communications system of claim 1 wherein each multifrequency signal comprises at least three frequencies so that the multifrequency signal is suppressed greater than ten dB below the simultaneously transmitted communications medium signal.

3. The co-channel communications system of claim 1 wherein each multifrequency signal comprises at least eighteen frequencies so that the multifrequency signal is suppressed greater than thirty-four dB below the simultaneously transmitted communications medium signal.

4. The co-channel communications system of claim 1 wherein the signal level of the multifrequency signal is attenutated prior to transmission.

5. The co-channel communications system of claim 1 wherein the spectral energy of the multifrequency data signal is suppressed greater than ten dB relative to the spectral energy of the communications medium signal.

6. The co-channel communications system of claim 1 wherein the spectral energy of the multifrequency data signal is suppressed greater than thirty dB relative to the spectral energy of the communications medium signal.

7. The co-channel communications system of claim 1 wherein the means for generating the plurality of spreading frequencies comprises a means for generating a closely packed set of fundamental frequencies which lie in the lower range of the communications medium signal bandwidth and corresponding harmonic frequencies of the fundamental frequencies.

8. The co-channel communications system of claim 7 wherein the fundamental frequencies and corresponding third and fifth harmonic frequencies are evenly distributed between the logic levels of the data signal being transmitted and are randomly divided into two sets of frequencies so that a low logic data signal will be transmitted as one set of fundamental, third and fifth harmonic frequencies and a high level logic level of the data signal will be transmitted as a different set of fundamental, third and fifth harmonic frequencies, each set being distributed throughout the communications medium channel bandwidth.

9. The co-channel communications system of claim 7 wherein the data signal is transmitted simultaneously with voice information and wherein the fundamental frequencies transmitted lie in the range of three hundred hertz to seven hundred hertz.

10. The co-channel communications system of claim 7 wherein third and fifth harmonics of the fundamental frequencies are generated simultaneously with the fundamental frequencies but are suppressed approximately ten dB and sixteen dB, respectively, below the fundamental frequencies.

11. The co-channel communications system of claim 7 further comprising:
    means for receiving the multifrequency data signal;
    means for decoding the multifrequency data signal; and
    means for regenerating the digital data signal.

12. The co-channel communications system of claim 11 wherein the means for decoding the multifrequency signal comprises:
    means for detecting whether the set of frequencies corresponding to a high logic level signal are being transmitted or the set of frequencies corresponding to a low logic level signal are being transmitted.

13. The co-channel communications system of claim 11 wherein the means for decoding the multifrequency signal comprises:
    means for generating the fundamental frequencies generated by the transmitter;
    means for generating third harmonics of the frequencies generated by the transmitter;
    means for generating fifth harmonics of the frequencies generated by the transmitter;
    a plurality of synchronous detectors, a synchronous detector corresponding to each fundamental, third and fifth harmonic frequency generated, for detecting the presence of a transmitted frequency, each of the synchronous detectors being connected to one of two summing amplifiers, the first summing amplifier being connected to synchronous detectors which detect frequencies corresponding to the set of frequencies corresponding to a high logic level of the data signal and the second of the summing amplifiers being connected to the synchronous detectors detecting frequencies corresponding to a low logic level of the data signal transmitted; and means for comparing the output of the two summing amplifiers to determine whether a high logic level or low logic level data signal is being transmitted.

14. The co-channel communications system of claim 13 wherein the means for comparing the output of the two summing amplifiers regenerates the digital data signal originally transmitted.

15. A method for simultaneously transmitting at least one digital data signal with a communications medium signal transmitted on a communications medium comprising the steps of:
generating a plurality of spreading frequencies;
combining the data signal and the plurality of spreading frequencies so that a first logic level of the data signal is transmitted as a multifrequency signal consisting of a first set of frequencies and a second logic level of the data signal is transmitted as a multifrequency signal consisting of a second set of frequencies; and
transmitting the resulting multifrequency signals on the same communications medium as the communications medium signal, but at a suppressed level relative to the communications medium signal.

16. The method of claim 15 wherein at least three frequencies are generated for each logic level and wherein the resulting multifrequency signal is transmitted at a level more than ten dB below the simultaneously transmitted communications medium signal.

17. The method of claim 15 wherein at least eighteen frequencies are generated for each logic level of the data signal and wherein the resulting multifrequency signal is transmitted at a level more than thirty-four dB below the simultaneously transmitted communications medium signal.

18. The method of claim 15 wherein the method further comprises the step of attenutating the multifrequency signals prior to transmission.

19. The method of claim 15 wherein the step of generating a plurality of spreading frequencies comprises the step of generating a closely packed set of fundamental frequencies which lie in the lower range of the communications medium signal bandwidth and corresponding harmonic frequencies of the fundamental frequency.

20. The method of claim 19 wherein the step of combining the data signal and the plurality of spreading frequencies comprises the steps of:
evenly distributing the fundamental frequencies and in the corresponding third and fifth harmonic frequencies between the logic levels of the data signal being transmitted; and
randomly dividing the two sets of frequencies between the two logic levels so that a low logic level data signal will be transmitted as one set of fundamental third and fifth harmonic frequencies and a high logic level of the data signal will be transmitted as a different set of fundamental third and fifth harmonic frequencies, each set being distributed throughout the communications medium bandwidth.

21. The method of claim 15 further comprising the steps of:
receiving the multifrequency data signal;
decoding the multifrequency data signal; and
regenerating the digital data signal.

22. The method of claim 21 wherein the step of decoding the multifrequency data signal comprises the step of determining whether the set of frequencies corresponding to a high level logic signal is being transmitted or the set of frequencies corresponding to a low logic level signal is being transmitted.

23. The method of claim 21 wherein the step of decoding the multifrequency data signal comprises:
generating the fundamental frequencies generated by the transmitter;
generating third harmonics of the frequencies generated by the transmitter;
generating fifth harmonics of the frequencies generated by the transmitter;
for each fundamental, third and fifth harmonic frequency generated detecting whether that frequency has been transmitted by the transmitter;
generating an output for each frequency that is transmitted by the generator;
summing the generated outputs for each frequency; and
comparing the summed outputs of the first set of frequencies corresponding to a high logic level with the summed output of the second set of frequencies corresponding to a low logic level signal to recreate the data signal transmitted.

* * * * *

UNITED STATES PATENT AND TRADEMARK OFFICE
CERTIFICATE OF CORRECTION

PATENT NO. : 4,425,642

DATED : January 10, 1984

INVENTOR(S) : Donald W. Moses et al.

It is certified that error appears in the above-identified patent and that said Letters Patent is hereby corrected as shown below:

In Claim 20, column 10, line 7, delete "in".

In Claim 20, column 10, line 14, delete "of the".

Signed and Sealed this

Fourteenth Day of October, 1986

[SEAL]

Attest:

DONALD J. QUIGG

*Attesting Officer*   *Commissioner of Patents and Trademarks*